March 7, 1933.    G. A. EDE    1,900,231
MEASURING DEVICE
Filed March 24, 1927    3 Sheets-Sheet 2
Fig. III
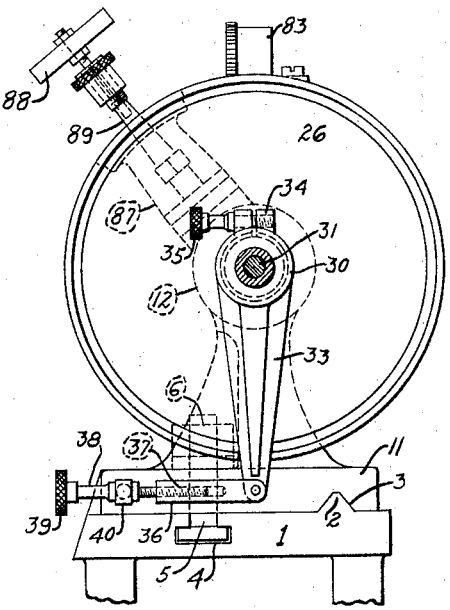
Fig. IV
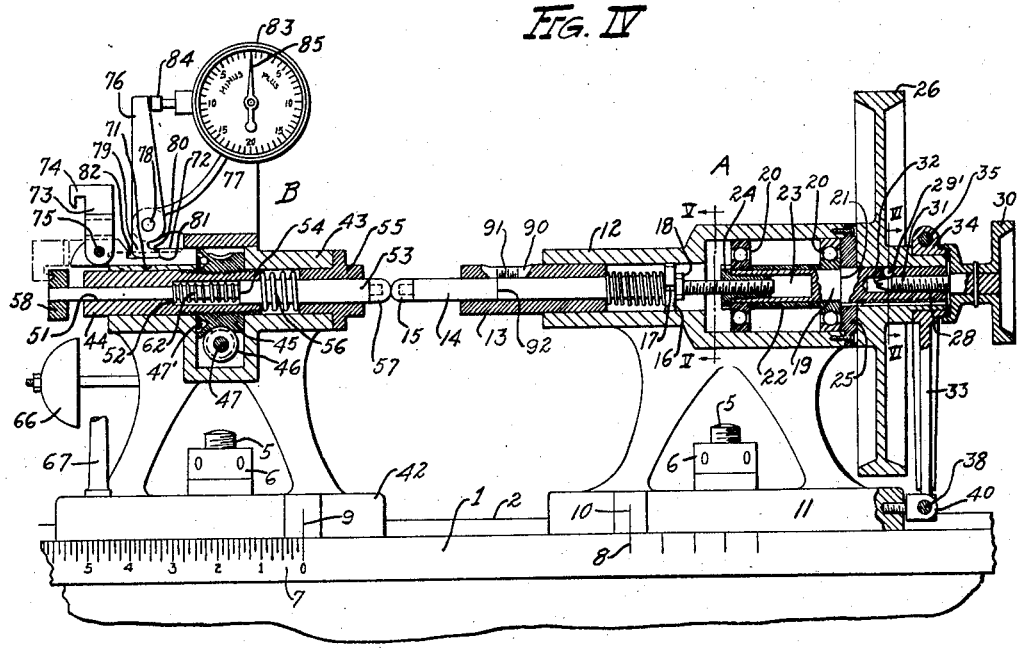
INVENTOR
G. A. EDE
BY H. S. Cook
ATTORNEY March 7, 1933. G. A. EDE 1,900,231
MEASURING DEVICE
Filed March 24, 1927 3 Sheets-Sheet 3
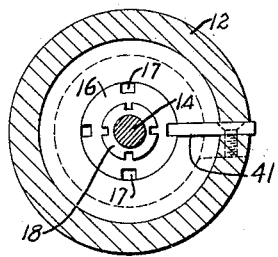
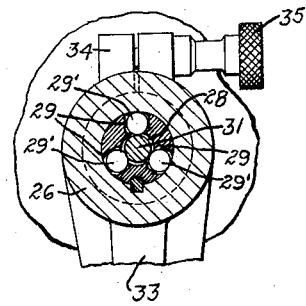
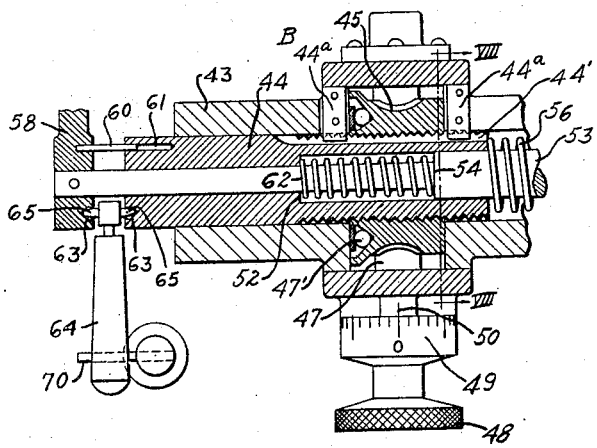
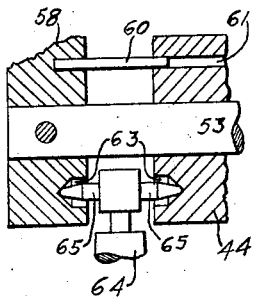
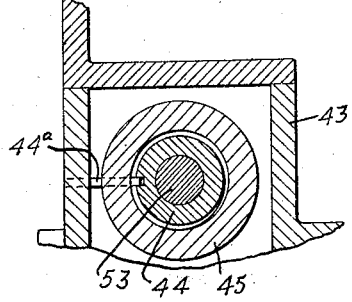
INVENTOR
G. A. EDE
BY
ATTORNEY Patented Mar. 7, 1933

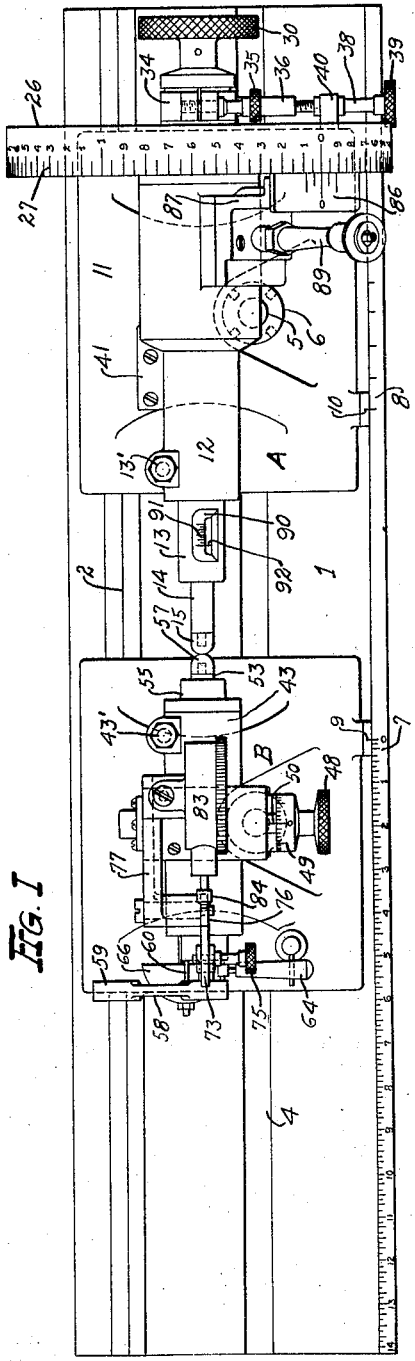
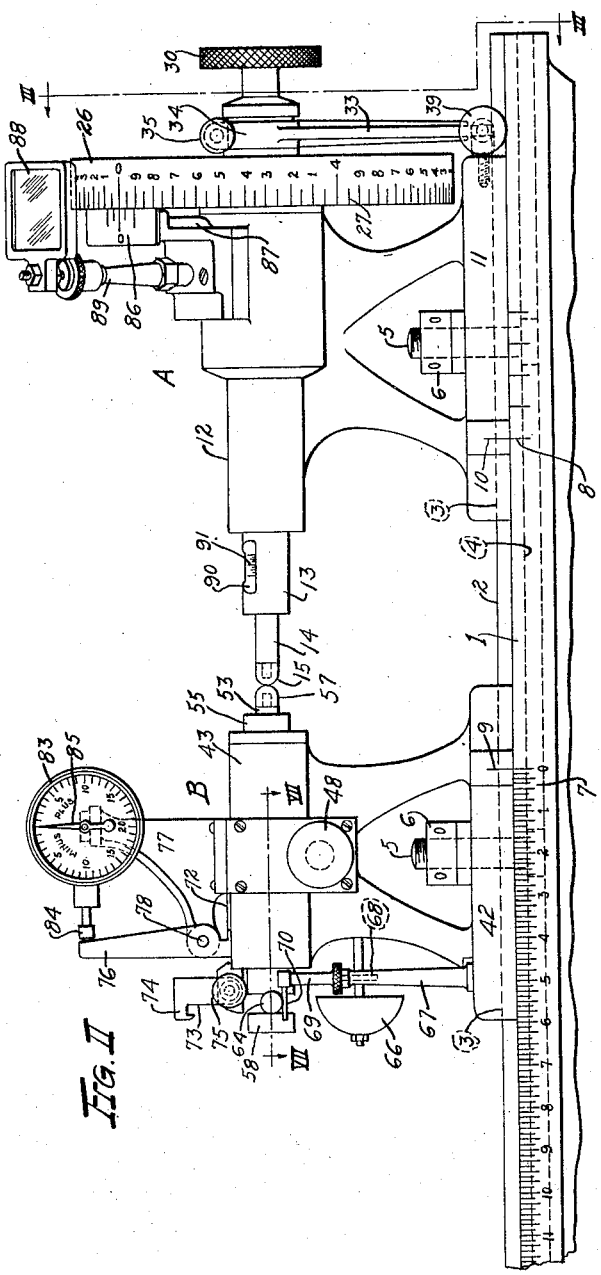

1,900,231

UNITED STATES PATENT OFFICE

GEORGE A. EDE, OF COBDEN, ILLINOIS

MEASURING DEVICE

Application filed March 24, 1927. Serial No. 177,876.

This invention relates to measuring devices and is illustrated herein as embodied in a device for use in measuring small distances and in obtaining extremely accurate measurements of various objects.

Heretofore a great number of measuring devices have been devised and many of these have been conceived for the purpose of obtaining measurements that are accurate to very small fractions of an inch. While many of these devices have been entirely satisfactory in performing various uses, it has always been desired to obtain measuring devices which will function yet more accurately and will measure to still smaller fractions of an inch. Accordingly, the present invention has for an important object thereof the provision of a device which will measure accurately to the hundred thousandth part of an inch. An important aspect of the invention resides in the fact that extremely accurate measurements are made by the use of a device which is comprised entirely of mechanical parts and employs neither electricity or light rays in performing its intended function.

In the illustrated embodiment of the invention there is provided a bed plate for supporting a plurality of measuring units comprising a head stock and a tail stock, for movement toward and away from each other. Thus the measuring units may be moved to obtain an approximate adjustment of them and subsequently measuring elements with which the units are provided may be moved relatively to each other and to the units for obtaining a final accurate adjustment. In the operation of the device the head stock and the measuring element with which the head stock is provided are moved into a predetermined position for performing a measuring operation, and thereafter the tail stock and the measuring element which is associated with the tail stock are operated to serve as calibrating means in obtaining a highly accurate adjustment of the measuring device prior to taking measurements.

An important feature of the invention consists in the provision in a measuring device of this character of a visible and audible signal which operates automatically to apprise the operative of the machine when an extremely accurate measurement of the material being tested has been obtained. In the illustrated embodiment of the invention the signal is disclosed in the form of an arm which is adapted to drop into engagement with a bell at a predetermined instant during the use of the device.

A further feature of the invention consists in providing a device of the character described with a plus and a minus indicating gage which may be utilized as a comparator in determining readily which of the pieces of material in a series are greater than a desired size and which are less. An additional feature of the invention consists in mounting the comparator mechanism in such a manner that it is normally inoperative but may be placed in operation with ease and without disturbing the remaining parts of the measuring device.

Still further novelty resides in providing the device with measuring elements having their ends constructed and arranged in such a manner that they may receive, interchangeably, measuring tips of any suitable shape. The feature of providing a measuring device with interchangeable measuring tips is extremely important, inasmuch as a device of this character is commonly employed to measure work of widely divergent shape and form.

Other features and objects of the invention will become apparent from the reading of the following specification in the light of the accompanying drawings, in which:

Fig. I is a plan view of a measuring device embodying the present invention,

Fig. II is a view in side elevation of the device shown in Fig. I,

Fig. III is a view in section taken along the line III—III of Fig. II,

Fig. IV is a view in front elevation of the device shown in Fig. I with certain parts broken away the more clearly to illustrate the construction of the device, Fig. V is a view in section taken along the line V—V of Fig. IV, Fig. VI is a view similar to Fig. V taken along the line VI—VI of Fig. IV, Fig. VII is an enlarged detail view in section taken along the line VII—VII of Fig. II, Fig. VIII is a view in section taken along the line VIII—VIII of Fig. VII, Fig. IX is an enlarged view in section showing manner in which the indicating arm is mounted.

As shown in the drawings, the reference numeral 1 indicates a base plate, or bed, which as shown in Fig. III, may be conveniently supported upon legs in such a manner that the upper surface of the plate is supported in a horizontal plane.

The measuring device is equipped with a plurality of measuring units which are supported upon the bed plate for adjustment across the plate independently of each other, and, for the sake of clarity in description, these measuring units will be hereinafter generally referred to as a head stock and a tail stock. As shown, the head stock has been designated by the letter A and the tail stock by the letter B; both of the stocks being provided on their under surfaces with similarly located grooves or guide-ways 3 for receiving a ridge or a guide 2 which projects upwardly from the base plate 1 and runs in a straight line completely across the plate.

By means of the groove 3 and the ridge 2, the measuring units will be guided positively in their movements across the surface of the bed plate, and, to the end of preventing accidental displacement of the ridge from the groove, the bed plate has formed therein a slot 4 (in the shape of an inverted T) which extends lengthwise of the bed plate parallel to the ridge 2. Each of the head and tail stocks is provided with a vertically extending bolt 5 having its head located within the groove, its shank extending through an aperture in the base of each of the head and tail stocks, and its threaded end engaged by a locking nut 6. From so much of the description as has already been given it is apparent that both the head and tail stocks may be adjusted longitudinally of the table and locked in an adjusted position, and to assist in obtaining accurate and predetermined adjustments the bed plate is provided with graduations 7 and 8 for cooperation with graduations 9 and 10 respectively carried by the bases 11—11 of the head and tail stocks.

Turning now to the construction of the head stock A, the reference numeral 12 indicates a hollow cylindrical body portion mounted to extend horizontally upon legs projecting upwardly from the base 11. The cylindrical body 12 is provided with a forward portion which is of less diameter than the rearmost portion thereof, and the reduced portion of the body 12 has a sleeve 13 extended into it as shown in Fig. IV, the reduced portion being split and adapted to be drawn together by means of a clamping screw 12 (Fig. I) whereby the sleeve may be fixedly clamped in place therein.

Supported within the sleeve 13 is a measuring element 14 which is arranged for movement longitudinally of the sleeve, the element 14 being provided with a reduced portion at its forward end adapted to receive a measuring tip 15 of a desired form. Mounted upon a reduced portion of the measuring element 14 is a disk 16 provided with circumferentially spaced notches 17, (Fig. V). The reduced extremity of the measuring element 14 is screw-threaded, and a nut 18, provided with notches to receive a spanner wrench, is screwed on the threaded extremity and is jammed against the disk 16 in a manner to cause said disk to be gripped between the shoulder referred to and said nut 18, whereby the disk is fixed to the measuring element 14. Interposed between the disk 16 and the end of the sleeve 13, and surrounding the measuring element 14, is a coil spring which tends to move the measuring element rearwardly longitudinally of the sleeve 13; it being recalled that the sleeve 13 is clamped within the body 12 and that the measuring element 14 is mounted for free sliding movement within the sleeve 13.

Extending longitudinally within the enlarged rearmost portion of the cylindrical body 12 of the head stock A is a rod 19 which has ball bearings 20 associated with it, whereby the rod may rotate freely. The rod 19 is provided with a slight annular shoulder 21 intermediately between its ends against which one of a plurality of bearings 20 bears; the bearings being spaced apart by means of a spacer 22 in the form of a sleeve. The rod 19 is provided with a threaded cylindrical recess 23 at its forward end, and 24 designates a plug which is screwed into the recess, as shown in Fig. IV. The plug 24 is provided with a longitudinally extending threaded opening for receiving the reduced threaded extremity of the measuring element 14 and with a head portion having circumferential notches adapted to receive a spanner wrench. The rearmost, enlarged end of the cylindrical body portion 12 is closed by a closure 25 which is secured in place by means of suitable fastenings, the closure being provided with a central opening through which the rod 19 extends.

From so much of the description as appears above, it will be seen that the construction of the head stock A is such that there is practically no lost motion whatsoever between the various parts comprising the stock, and hence little opportunity for inaccuracies arising out of the operation of the stock. Thus the compression spring which is disposed between the sleeve 13 and the disk 16 tends to move the measuring element 14 to the right of the position shown in Fig. IV, thereby preventing back-lash between the screw-threaded extremity of the measuring element and the plug 24. Also, the plug, when screwed firmly into the recess 23, presses the outer bearing 20 against the spacer sleeve 22, which is in turn pressed against the inner bearing member 20, thereby gripping the two bearing members and the sleeve between the plug 24 and the shoulder 21 of the rod within which the plug is mounted. It will therefore be understood that there can be no accidental relative movement between the parts described, and there is provided means hereinafter to be described which prevents accidental movement of these parts with relation to the hollow cylindrical body portion 12.

The head stock A is provided with a micrometer adjustment for moving the measuring element 14 lengthwise of the body portion 12, and, as illustrated, this adjustment comprises a micrometer head 26, having graduations 27 formed in its circumferential face, keyed to the rod 19, as clearly shown in Fig. VI. By means of the key and slot arrangement rotary movement that is imparted to the micrometer head 26 will be imparted directly to the rod 19. To render the adjustment extremely accurate however, and to prevent play between the head 26 and the rod 19 there is provided a handwheel 30 having a threaded shaft 31 adapted to engage within a threaded recess located in the extremity of the rod 19 opposite to the opening 23. As shown in Fig. VI, the rod 19 is bored out radially at 29 to receive a plurality of ball bearings 29' which are adapted to be engaged by the conical extremity 32 of the shank of the handwheel 30. Thus, in assembling the device the extremity 32 serves as a cam in forcing the ball bearings 29' outwardly against the wall of the central opening in the micrometer head 26, thereby presenting an extremely accurate and efficient means of securing the head to the rod 19. It is to be observed that the openings 29 are restricted at their inner and outer ends to prevent accidental displacement of the ball bearings 29' during assemblage or disassemblage of the device.

In the illustrated embodiment of the invention there is provided means for imparting minutely precise rotary adjustments to the micrometer head 26, and accordingly the head is provided with a reduced hub portion to which an arm 33 is secured by means of a clamping screw 35 (Figs. III and IV) arranged to engage the ears of a split collar 34. The lower extremity of the arm 33 is connected to a link 36 which is interiorly screw-threaded at 37 for engagement by an adjusting screw 39. The adjusting screw is provided with a shank 38 which is seated within a bearing 30 secured to the base 11 of the head stock A.

It is obvious that extremely fine adjustments of the micrometer head may be obtained by means of the above described feature of construction, and it is equally obvious that, if desired, the clamping screw 35 may be loosened and the head 27 rotated manually without employing the adjusting screw 38.

In the operation of the head stock A, rotation of the micrometer head causes rotation of the rod 19 and the plug 24 which is rigidly secured within one of the openings in the end of the rod. By means of a plate 41, shown in Fig. V, which is rigidly secured to the body portion 12 of the head stock and engaged within one of the peripheral openings 17 formed in the disk 16, the latter is prevented from rotating, and since the disk is rigidly secured to the measuring element 14, this latter element is likewise held against rotary movement. By virtue of such a construction rotary movement imparted to the plug 24 results in linear movement being imparted to the measuring element 14, thereby causing that element to move in a straight line towards or away from the oppositely facing tail stock B, depending on the direction of rotation of the micrometer head. In this connection it is to be appreciated that every feature of construction of the head stock, and every arrangement of parts therein aims to the accomplishment of obtaining extremely small and highly accurate adjustments of the measuring element which is carried by the head stock.

With reference now to the construction of the remaining measuring unit, or tail stock B, there is provided a support comprising a base portion 42 and an upper cylindrical body portion 43, similar in function to the body portion 12, between which a web portion is interposed. Arranged within the body member 43 is a sleeve member 44 which is movable longitudinally of the body 43 and is provided with external screw-threads formed over a portion of its length adjacent to one end thereof, as shown clearly in Fig. IV.

To the end of preventing rotary movement of the sleeve 44 relatively to the body 43, the sleeve as shown in Figs. VII and VIII, is provided with a keyway 44' formed longitudinally of the forward portion thereof, and 44$^a$ designates a pair of plates rigid with a stationary part of the unit support, having their inner ends arranged to extend into the keyway.

For the purpose of imparting lengthwise movement to the sleeve 44 relatively to the body 43, the device is equipped with a worm gear 45 mounted in screw threaded engagement with the sleeve as shown in Fig. VII. A worm 46 (Fig. IV) is arranged to engage the gear 45 and is rigidly mounted on a shaft 47 having a thumb wheel 48 secured thereto.

A series of graduations 49 are marked on the thumb wheel and may be read in conjunction with the index mark 50 in determining the amount of movement imparted to the sleeve 44.

As shown in Fig. IV, a thrust bearing is positioned between one side of the worm gear 45 and the sleeve member 44, for the purpose of reducing the frictional engagement between the members, and mainly to prevent play or accidental movement of the worm 45 and the sleeve 44 relatively to the other parts of the tail stock. Such a provision lends itself to accuracy.

The tail stock B is provided with a measuring element 53 which extends interiorly of the sleeve 44. As shown, one end of the measuring element 53 is smaller than the opposite end, thereby providing a shoulder 54, between which and a shoulder 52, formed by reducing at 51 the size of the opening within the sleeve, there is arranged a compression spring 62 tending normally to urge the measuring element 53 to the right of the position illustrated in Fig. IV. A second compression spring 56 is inserted between the end of the sleeve 44 and a plug 55, which tends to prevent back-lash between the worm 46 and gear 45, thereby permitting the measuring element 53 to be adjusted with accuracy and precision by means of the thumb wheel 45.

Similarly to the construction of the element 14, the measuring element 53 of the tail stock is provided with a suitable tip 57 which may, as desired, be interchanged with other tips.

The tail stock has associated with it means which may be employed during the operation of the measuring device for indicating visibly the point of adjustment at which an accurate measurement of a piece of material has been obtained, and in the actual use of the device when the visible indication appears, the operative immediately ceases making adjustments and reads the markings with which the device is provided. As shown in Figs. I, II and VII, for example, the indicating means comprises an arm 58 fixed to the end of the measuring element opposite the measuring tip 57, a weight 29 secured to the end of the arm 58, and a guide 60 and guideway 61 for relieving the measuring element 53 of the burden of the weight 59. As shown in Fig. VII a signal arm or lever 64 is provided with oppositely extending lateral projections 65 having hemispherical end portions adapted to be seated within depressions or recesses 63 (Fig. IX) formed one in each of the arm 58 and the sleeve 44. The depressions 63 are in alinement with each other and have their bottoms of a conical formation for affording some amount of frictional contact between the depressions and the projections 65.

The arm 64 normally extends outwardly from its point of support in an approximately horizontal position, and inasmuch as the coil spring 62 tends to draw the measuring element 53 and the arm 58 toward the end of the member 44, the rounded ends of the laterally extended projections 65 and the conical walls at the bottom of the recesses 63 will be forced into such close contact with each other that the friction resulting will support the arm 64, which is formed of very light material, in a raised position. Supported by the measuring unit B at a point below the arm 64 is a bell, or similar device for giving an audible signal when struck, the bell being in such a position that it will be struck by the outer end portion of the arm 64 upon the arm swinging downwardly about its pivot point. Under ordinary circumstances, as already explained, the friction between the rounded ends of the laterally extended projections 65 and the recesses 63 will maintain the outer end portion of the arm 64 in a raised position, but it is plain that if the measuring element 53 be moved against the pressure of the coil spring 62, the arm 58 will be moved away from the end of the member 44, whereby the friction referred to, between the rounded ends of the laterally extended projections and the associated recesses, will be relieved, thus permitting the outer end portion of the arm 64 to swing downwardly and strike the bell 66 rendering an audible as well as a visible signal.

To maintain the arm 64 in a raised position while the device is being set, and to insure that the arm will occupy the same position during successive settings of that device, whereby a high degree of accuracy is obtained, there is provided an upright standard 67 (Fig. II) having a recess 68 at its upper end for receiving a vertically extending member 69 in a manner to permit the member to rotate axially. The member 69 is provided with a horizontally arranged pin 70 at its upper end on which the arm 64 is adapted to rest, during the setting of the device and also when it is desired to render the audible and visible signal device inoperative.

It has been hereinbefore pointed out that the micrometer head 26 bears graduations 27, and to the end of assisting in making an accurate and precise reading of the graduations to determine the adjustment of the measuring element 14, there is provided a bracket 87 to the upper extremity of which is secured a vernier 86. A magnifying glass 88 mounted upon a standard 89 is located directly above the vernier to permit the setting of the micrometer head with respect to the vernier to be read with ease and accuracy. It is to be observed, therefore, that the distance the index graduation on the micrometer head 26 is moved from the index graduation on the vernier may be reckoned readily, but it is also to be observed that if the micrometer head has made one or more complete revolutions, this fact will not be disclosed by the vernier. Accordingly, and to the end of providing means whereby it may be readily ascertained if the micrometer head has moved through one or more complete rotations, and the number of rotations through which it has moved, the sleeve 13 which holds the measuring element 14 is provided with an opening 90 having a sloping side wall, upon which there is marked a series of graduations 91 arranged to cooperate with an index mark 92 formed on the measuring element. The graduations 91 are so spaced that a complete revolution of the micrometer head 26 causes the index mark 92 to be advanced one space along the graduations 91. By means of such a provision, the adjustment imparted to the micrometer head may be readily determined: the complete revolutions of the head by referring to the scale 91 and the index 92, and the partial revolutions by reading the vernier 86.

The following few paragraphs will be devoted to a discussion of the operation of so much of the device as has already been described, and for the sake of convenience in description, it will be assumed that it is desired to measure with the device a piece of material which is approximately 4⅛ inches in length.

When the approximate length of the material has been thus determined and with all of the parts initially set at their zero position, the locking nut 6 associated with the tail stock B is loosened and the stock is moved 4⅛ inches to the left of the position shown in Fig. IV, this distance being readily determined by means of the index 9 and the graduated scale 7. With the tail stock secured in the adjusted position, the thumb wheel 48 is next rotated to move the measuring element 53 a slight distance to the left of the position shown in Fig. IV. When the parts have been thus positioned, a standard distance piece measuring 4⅛ inches in length is introduced between the inner ends of the measuring elements 14 and 53 and the thumb wheel 48 is again rotated until the tip 57 of the measuring element 53 touches the distance piece which is in engagement with the tip 15 of the measuring element 14. Upon the tip 57 moving into contact with the distance piece, the operative of the machine is immediately apprised of the fact by reason of the fact that the first minute rearward movement of the measuring element 53 releases the signal lever 64, thereby permitting that member to drop onto the signal bell 66. When, therefore, the arm 64 drops, or the bell 66 is sounded, the operator will know that the distance between the tips of the measuring elements represents the exact dimension of the standard distance piece positioned between the tips.

It will be appreciated that during the setting up operation just described, the micrometer head 26 has been maintained in a zero position, and to the end of checking the accuracy of this primary adjusting or setting up of the device, the micrometer head may be rotated in a direction to move the tip of the measuring element 14 away from the standard distance piece, the arm 64 may then be raised, in which position it will be retained by means of the coiled compression spring 62 tending to move the measuring element 53 in the direction of the standard distance piece, and then the micrometer head may be rotated in the reverse direction to move the tip 15 of the measuring element 14 back into engagement with the face of the standard distance element, thereby again releasing the arm 64 and permitting it to drop into engagement with the bell 66. If, at the time the arm 64 falls and strikes the bell, the micrometer head again occupies its zero position, it will have been proved by this calibration that the device is accurately adjusted to perform the desired measurement. If, however, the signal is sounded before or after the micrometer head moves into its zero position, the thumb disk 48 must be rotated in one direction or the other to adjust the position of the measuring tip 57 until the audible signal is sounded precisely as the micrometer head reaches the zero position. Thus it will be seen that there is presented a measuring device which may be calibrated with extreme accuracy and precision before performing a measurement, and this calibration is carried out by what is in effect a trial and error method.

When the measuring elements 14 and 53 have thus been properly spaced, the standard distance piece is removed from between the ends of the measuring elements, and the micrometer head 26 is rotated to move the measuring element 14 away from the element 53. With the parts so positioned, the piece which it is desired to measure is inserted between the tips of the measuring elements, and the micrometer head is then rotated to move the measuring element 14 in the direction of the element 53, and, when the measuring element 14 contacts with the piece being measured, the slight rearward movement imparted to the measuring element 53 will release the signal arm 64 and permit it to fall into engagement with the signal bell 66. When the alarm has been sounded as described, the operative will refer to the graduations on the micrometer head, which preferably indicate ten-thousandths of an inch, and to the graduations on the vernier 86, and he may thus determine whether or not the piece being measured is the proper size, or if it is over or under size; for, if the piece is exactly the proper size the signal will have sounded when the micrometer head is at the zero position, while if the piece is under or over size the signal will have sounded, respectively, before or after the micrometer head reaches the zero position. It is plain, therefore, that if the piece being measured is under or over size the operator may determine the exact error in ten-thousandths of an inch by means of the vernier 86.

During the measuring operation, when the micrometer head is approaching the signal point it is not advisable always to rely on the steadiness of the hand of the operative in rotating the head, and it is at such times that the clamping screw 35 (Fig. III) may advantageously be tightened to clamp the arm 33 to the hub of the micrometer head, and thereafter the adjusting screw 39 may be utilized to rotate the head extremely slowly and highly accurately.

It has hereinbefore been pointed out that the measuring tips 15 and 57 may be removed from the measuring elements 14 and 53, respectively, and interchanged with other tips of different shapes which will be better suited to a particular type of measuring. In interchanging the measuring tips it is sometimes found that the amount of separation between the ends of the measuring elements may necessarily vary to accommodate tips of different lengths, and it is to this end that the index 10 and the graduation 8 are associated with the base 11 of the head stock A. Thus, in using the interchangeable tips, it will be known beforehand the exact separation required for a certain pair of tips, and before applying them the base 11 may be adjusted relatively to the graduations 8 to accommodate the increase or decrease in separation. By virtue of such an arrangement the increase or decrease in the required separation will be compensated for solely by the head stock, and the tail stock, not being put to such adjustments, will at all times be positioned for movement toward and away from the head stock, the extent of such movement being determined accurately by the scale 7 on the base plate of the machine and the graduations 49 on the thumb screw 48.

The description which has so far been given describes the construction of the device with reference to its adaptability for performing extremely accurate and precise measurements. The device, however, is provided with means which renders it capable for use as a comparator in determining readily which of a series of pieces of material are less than, and which are greater than, a particular dimension. Accordingly, and as illustrated, the cylindrical body portion 43 of the tail stock is provided, as shown in Fig. IV, with a longitudinally extending horizontal guideway 71, in which a bar 72 (Figs. II and IV) is arranged to extend. Pivotally attached to the bar 72 at the rear end thereof is an extension 73, provided with a hook-shaped end 74, which may be, by means of a clamping screw 75, secured in a vertically extending position as shown in Figs. II and IV, or in a horizontally extending position as shown in dotted lines in Fig. IV. When the extension 73 occupies a horizontally extending position the hooked extremity 74 of the extension overlies the rear face of the arm 58, thereby causing movement imparted to the arm 58 to be transmitted to the extension 73 and thence to the horizontally extending bar 72. A plus and minus indicator gage 83 is mounted at the upper extremity of a pedestal 77 extending from the tail stock B, and movement imparted to the extension 73 and bar 72 is adapted to be imparted to an indicating pointer 85, on the plus and minus gage, by means of a lever 76 pivoted at 78 for engagement with a plunger 84 extending outwardly from the indicator 83.

The plus and minus indicator 83 is of an ordinary construction and contains the customary spring, or other resilient means, for urging the plunger 84 yieldingly outwardly. Thus there is a constant tendency on the part of the plunger to move the lever 76 to the left of the position shown in Fig. IV, thereby moving the bar 72 to the right by means of the lower extremity 79 of the lever engaging the projection 81 of the bar. This tendency is, however, overcome when the extension 73 occupies its operative position with the hook-shaped extremity 74 in the rear of the arm 58, for, in that instance, the presence of the signal arm between the arm 58 and the sleeve 44 prevents movement of the arm to the right of the position illustrated, and hence prevents movement of the extension 73 in that direction. It will be observed, however, that the measuring element 53 and arm 58 are free to move to the left of the position illustrated in Fig. IV, and if the extension 73 is positioned so as to overhang the rear of the arm 58, this movement will cause the extension to move to the left, thereby resulting in the shoulder 81 of the rod 71 swinging the lever 76 to the right of the position shown and the indicating pointer 85 moving counterclockwise around the indicator 83 to register "plus". Since the measuring element 53 is ordinarily held against movement to the right of the position illustrated in Fig. IV, there can be, as above pointed out, no movement of the rod 71 to the right of the position shown. Of course, the plunger 84 tends to hold the rod at its extreme righthand position, but when so held and with the measuring elements separated a predetermined distance, if a piece of material, smaller than that for which the measuring elements were set, should be introduced between the elements, there would be no movement of the parts comprising the tail stock and hence no "minus" indication appearing on the indicator 83.

In order that the device may serve to indicate relatively short pieces as well as relatively long pieces, the dial of the indicating gage is rotated relatively to the pointer, and the tips 15 and 57 of the measuring elements 14 and 53 are moved together until the distance between them is less than the dimension with which the pieces are being compared; the insufficiency being of any desired amount, such, for example, as fifteen ten-thousandths of an inch.

The setting of the face of the indicator gage is such, with relation to the spacing of the tips of the measuring elements, that movement of the measuring element 53 rearwardly, to a point where the inner ends of said measuring elements are spaced apart a distance to the exact dimension with which the pieces are being compared, will rotate the pointer of the gage 83 precisely to the zero position of the dial, and if the space between the inner ends of the measuring elements is less or more than the exact dimension of the piece to be measured the indicator will, respectively, fall short of reaching the zero position, or the indicator will pass beyond the zero position.

With the parts arranged as described, the pieces are individually introduced between the inner ends of the tips 15 and 57, the rounded ends thereof permitting this, and as each piece being measured forces the measuring element 53 rearwardly the indicator 83 will indicate whether said piece is exactly the right dimension, in which event the indicator of the gage will point to zero, or said indicator will show whether or not the piece is under or over the desired dimension, as, if it is under size, the indicator will stop at the minus side of the zero position, while if the piece is over size the indicator will pass beyond the zero position to the plus side of the zero position. It is obvious, of course, that the number of graduations from the point at which the indicator stops to the zero position will indicate the error in the dimension of the piece being measured.

While the invention has been described herein with reference to obtaining measurements in inches and fractions of inches, it is to be appreciated that the invention contemplates measuring in centimeters and millimeters, and other units as well, and in fact the construction is such that merely by changing the threads on the measuring unit 14 and the plug with which the threads are associated the device may be used in obtaining measurements in the metric system.

Having thus described my invention, what I claim as new and desire to secure by Letters Patent of the United States is:

1. A measuring device comprising oppositely disposed measuring units, measuring elements associated with and supported by the respective measuring units, and means associated with one of said measuring units whereby the measuring element associated therewith may be adjusted with respect to the associated measuring unit, said means comprising means adapted to prevent rotation of said measuring element, a rotatable element including a screw-threaded portion adapted to receive a screw-threaded portion of said measuring element whereby rotation of said rotatable element will impart linear movement to said measuring element, means whereby said rotatable element may be manually rotated, and means whereby the last-mentioned means may be prevented from moving undesignedly with respect to said rotatable element, said means for preventing undesigned movement comprising a plurality of radially movable members carried by said rotatable element, and means whereby said radially movable members may be forced into firm contact with a portion of the means for rotating said rotatable element.

2. A measuring device comprising oppositely disposed measuring units, measuring elements associated with and supported by the respective measuring units, and means associated with one of said measuring units whereby the measuring element associated therewith may be adjusted with respect to the associated measuring unit, said means comprising means adapted to prevent rotation of said measuring element, a rotatable element including a screw-threaded portion adapted to receive a screw-threaded portion of said measuring element whereby rotation of said rotatable element will impart linear movement to said measuring element, a rotatable micrometer head mounted on said rotatable element, and means whereby said micrometer head may be prevented from moving undesignedly with respect to said rotatable element, said latter named means comprising a plurality of radially movable balls carried by said rotatable element, and a member provided with an inclined face adapted to force said radially movable balls into firm contact with a portion of said micrometer head.

3. A measuring device comprising a measuring unit, a measuring element associated with said measuring unit, means whereby said measuring element may be adjusted, a second measuring unit arranged in opposed relationship with respect to the first-mentioned measuring unit and adjustable with respect thereto, a measuring element associated with the last-mentioned measuring unit, a sleeve provided with external screw-threads, a worm wheel provided with screw-threads cooperating with the screw-threads on said sleeve, a worm adapted to rotate said worm wheel, and connecting means comprising a coil spring between said sleeve and said measuring element whereby longitudinal movement imparted to said sleeve through the instrumentality of said worm and worm wheel will be transmitted to said measuring element.

4. A measuring device comprising a measuring unit, a measuring element associated with said measuring unit, means whereby said measuring element may be adjusted, a second measuring unit arranged in opposed relationship with respect to the first-mentioned measuring unit and adjustable with respect thereto, a measuring element associated with the last-mentioned measuring unit, a sleeve provided with external screw-threads, a worm wheel provided with screw-threads cooperating with the screw-threads on said sleeve, a worm adapted to rotate said worm wheel, connecting means comprising a coil spring between said sleeve and said measuring element whereby longitudinal movement imparted to said sleeve through the instrumentality of said worm and worm wheel will be transmitted to said measuring element, and a second coil spring adapted to prevent lost motion between the cooperating screw-threads on said sleeve and said worm wheel.

5. A measuring device comprising a measuring unit, a measuring element associated with said measuring unit, a second measuring unit arranged in opposed relationship with respect to the first-mentioned measuring unit and adjustable with respect thereto, a measuring element associated with the last-mentioned measuring unit, means whereby the last-mentioned measuring element may be adjusted, said means comprising an externally threaded sleeve through which said measuring unit passes, a worm wheel having screw-threads in the hub portion thereof which are adapted to cooperate with the screw-threads on said sleeve, a worm adapted to rotate said worm wheel, a coil spring adapted to flexibly associate said measuring element with said sleeve, an arm pivotally supported by said measuring element and said sleeve, and a bell adapted to be struck by said arm, said arm being retained in a raised position by pressure applied thereto by the measuring element associated with the last-mentioned measuring unit and being permitted to fall downwardly when said pressure is relieved.

6. A measuring device comprising a support, a measuring element carried by said support, means for adjusting said measuring element relative to said support, a coil spring associated with said measuring element in such manner that it tends to move said measuring element longitudinally in one direction relative to the support and yields to permit movement of said measuring element in the opposite longitudinal direction relative to said support and independently of said means for adjusting said measuring element, an arm supported at one end for pivotal movement, spaced elements for pivotally supporting said arm and provided with recesses having conical inner portions, one of said spaced elements being movable with said measuring element and with respect to the other spaced element on longitudinal movement of said measuring element, said arm being provided with laterally extended projections having rounded outer ends which are extended into the recesses in said spaced elements, said arm being adapted to be supported in a position where its outer free end is held in an elevated position by friction between said rounded ends of said projections and the walls of said conical portions of said recesses and being permitted to swing downwardly when this friction is relieved by movement of one spaced element away from the other when the measuring element with which the first-mentioned spaced element is movable is subjected to movement against the tension of said coil spring, and a signal device adapted to be struck by said arm.

In testimony that I claim the foregoing I hereunto affix my signature.

GEORGE A. EDE.